US011867244B2

(12) United States Patent
Bourlon et al.

(10) Patent No.: US 11,867,244 B2
(45) Date of Patent: Jan. 9, 2024

(54) DISC BRAKE OFFERING A BALANCED DISTRIBUTION OF THRUST FORCES APPLIED BY A PISTON ONTO AT LEAST ONE BRAKE PAD

(71) Applicant: FOUNDATION BRAKES FRANCE, Drancy (FR)

(72) Inventors: Philippe Bourlon, Drancy (FR); Thierry Pasquet, Vincennes (FR)

(73) Assignee: FOUNDATION BRAKES FRANCE, Drancy (FR)

(*) Notice: Subject to any disclaimer, the term of this patent is extended or adjusted under 35 U.S.C. 154(b) by 271 days.

(21) Appl. No.: 17/294,626

(22) PCT Filed: Nov. 20, 2019

(86) PCT No.: PCT/FR2019/052762
§ 371 (c)(1),
(2) Date: May 17, 2021

(87) PCT Pub. No.: WO2020/104752
PCT Pub. Date: May 28, 2020

(65) Prior Publication Data
US 2022/0010852 A1    Jan. 13, 2022

(30) Foreign Application Priority Data
Nov. 21, 2018   (FR) ....................... 1871685

(51) Int. Cl.
*F16D 65/18*       (2006.01)
*F16D 55/226*      (2006.01)
(Continued)

(52) U.S. Cl.
CPC ........... *F16D 65/18* (2013.01); *F16D 55/227* (2013.01); *F16D 55/2262* (2013.01);
(Continued)

(58) Field of Classification Search
CPC .... F16D 65/18; F16D 65/0068; F16D 65/097; F16D 55/2262; F16D 2055/0016; F16D 2121/04
(Continued)

(56) References Cited

U.S. PATENT DOCUMENTS 3,743,060 A * 7/1973 Hendrickson ......... F16D 55/224
188/196 P
7,364,021 B2 * 4/2008 Baumann ................ B60T 8/261
188/72.1
(Continued)

FOREIGN PATENT DOCUMENTS

DE   202016003835 U1   9/2016
FR      3024516 A1     2/2016
(Continued)

OTHER PUBLICATIONS

International Search Report for PCT/FR2019/052762 dated Mar. 10, 2020.
(Continued)

*Primary Examiner* — Christopher P Schwartz
(74) *Attorney, Agent, or Firm* — Pearne & Gordon LLP (57) ABSTRACT

Disc brake comprising a yoke, at least one first brake pad mounted so as to slide within the yoke, the first brake pad comprising a pad support and a friction material, a caliper comprising at least one piston mounted so as to slide within the caliper in such a way as to move the first brake pad in relation to the yoke, at least one actuator configured to move the piston axially, and a separators device inserted between the piston and the first brake pad forming an equaliser so as to distribute the thrust force exerted by the piston onto at least two zones of the first brake pad, at least partially distinct from the projection of the piston onto the first brake pad.

20 Claims, 6 Drawing Sheets

(51) Int. Cl.
   *F16D 55/227*   (2006.01)
   *F16D 65/00*    (2006.01)
   *F16D 65/097*   (2006.01)
   *F16D 55/00*    (2006.01)
   *F16D 121/04*   (2012.01)
   *F16D 125/58*   (2012.01)

(52) U.S. Cl.
   CPC ....... *F16D 65/0068* (2013.01); *F16D 65/097* (2013.01); *F16D 2055/0016* (2013.01); *F16D 2121/04* (2013.01); *F16D 2125/587* (2013.01)

(58) Field of Classification Search
   USPC .... 188/71.1, 72.1–72.9, 73.39, 73.42, 73.43, 188/369, 370
   See application file for complete search history.

(56) References Cited

U.S. PATENT DOCUMENTS

| | | | |
|---|---|---|---|
| 9,239,088 B2* | 1/2016 | Roehling | F16D 65/092 |
| 10,393,245 B2 | 8/2019 | Pasquet et al. | |
| 10,851,857 B2* | 12/2020 | Baumgartner | F16D 65/18 |
| 2007/0209891 A1* | 9/2007 | Stensson | F16D 65/38 |
| | | | 188/247 |
| 2008/0210498 A1* | 9/2008 | Baumgartner | F16D 65/092 |
| | | | 188/72.2 |
| 2014/0090934 A1* | 4/2014 | Pritz | F16D 65/567 |
| | | | 188/72.4 |
| 2018/0029574 A1* | 2/2018 | Mannherz | B60T 13/662 |
| 2018/0298963 A1* | 10/2018 | Demorais | F16D 55/225 |
| 2020/0063810 A1 | 2/2020 | Bourlon | |
| 2020/0102008 A1 | 4/2020 | Pasquet | |
| 2020/0114891 A1 | 4/2020 | Pasquet | |
| 2020/0361438 A1 | 11/2020 | Pasquet et al. | |

FOREIGN PATENT DOCUMENTS

| | | | | |
|---|---|---|---|---|
| WO | WO-2014001450 A1 * | 1/2014 | ......... | F16D 65/0068 |
| WO | WO-2014001456 A1 * | 1/2014 | ............. | F16D 65/18 |

OTHER PUBLICATIONS

Written Opinion for PCT/FR2019/052762 dated Mar. 10, 2020.
French Search Report for French application No. 1871685 dated Oct. 2, 2019.

* cited by examiner

DISC BRAKE OFFERING A BALANCED DISTRIBUTION OF THRUST FORCES APPLIED BY A PISTON ONTO AT LEAST ONE BRAKE PAD

CROSS-REFERENCE TO RELATED APPLICATIONS

This is a National Stage of PCT international application PCT/FR2019/052762, filed on Nov. 20, 2019, which claims the priority of French Patent Application No. 1871685, filed Nov. 21, 2018, both of which are incorporated herein by reference in their entirety.

TECHNICAL FIELD AND STATE OF THE ART

The present invention is concerned with the field of disc brakes, especially disc brakes which are at least partly electrically actuated.

An example of a disc brake comprises a carrier for being attached to a stub axle of an automotive vehicle, a caliper floatingly mounted with respect to the carrier, two brake pads for contacting with a brake disc rotatably attached to a wheel. The caliper comprises a piston which can be moved under the action of a pressurised fluid to apply one of the pads against one face of the brake disc. By reaction, the caliper slides and applies the other pad against the other face of the brake disc.

When the pressure is released, the piston moves back and allows the pad in contact with it to move away from the brake disc, the braking force is cancelled. The other pad also moves away from the other face of the disc.

In the automotive industry, the function of the parking brake is to stop the vehicle at a standstill in order to prevent it from moving unexpectedly. It furthermore fulfils the legal requirement for a second braking system independent of the generally hydraulic, service braking system.

There are also disc brakes equipped with an electromechanical parking brake, with braking during the driving phase being achieved by hydraulic actuation, comprising a device which, under the action of an electric motor, allows the piston to be moved in order to apply the brake pads against the disc. The device is, for example, with a worm gear and is housed in the piston. A button located in the passenger compartment enables the parking brake to be activated.

There are also disc brakes with fully electromechanical actuation. Such a brake is for example described in document FR 3024516.

It is desirable to have a disc brake in which the thrust force of the piston on the brake pad is distributed in a more balanced manner.

In addition, in applications to great size and/or high power vehicles, it is intended to use dual-piston disc brakes, i.e. comprising two pistons which are actuated simultaneously to apply the pads against the disc. Such a disc brake can generate high braking power.

This type of disc brake is used, for example, in large-displacement sports cars or in SUVs (sport utility vehicles).

When an electromechanical parking brake function is desired to be integrated into a dual-piston disc brake, a motor and a power chain for each piston are required. However, the implementation of both motors increases the overall size of the brake as well as its mass. Further, such integration is complex.

DISCLOSURE OF THE INVENTION

A purpose of the present invention is therefore to provide a disc brake in which the thrust force of the piston on the brake pad is distributed in a more balanced manner.

A further purpose of the present invention is to provide a disc brake capable of developing high braking power with a reduced mass and/or overall size as compared with disc brakes of the state of the art developing equivalent braking power. It is also a purpose of the present invention to offer an electric disc brake having the same overall size as a hydraulic brake, especially a dual-piston hydraulic brake.

The aforesaid purpose is achieved by a disc brake comprising a caliper, a carrier, at least one brake pad, at least one piston and an electromechanical actuator configured to move the piston so as to apply the brake pad against the disc. The disc brake also comprises an interposed device mounted between the nose of the piston and the pad enabling the thrust force of said piston to be distributed in a balanced manner over the brake pad.

For this, the interposed device is of the spreader type to ensure a balanced distribution of the thrust force of the piston in at least two zones of the pad.

For example, the brake pad is that of a dual-piston disc brake and the zones are those where both pistons of a conventional dual-piston disc brake would normally press against the pad. In this example, the interposed device simulates the application of thrust forces from at least two pistons, so that the pad bears the pressing of at least two pistons against it.

Thus the invention makes it possible to apply thrust forces of a dual-piston brake from a single piston advantageously driven by a single electric actuator without modifying the mechanical strength of the brake, because the part which supports both pistons in a dual-piston brake does not participate in the mechanical strength of the brake. In addition, the weight saving is important because this part is generally made of cast iron.

Very advantageously, the interposed device with a spreader comprises several parts hinged to each other by means of ball joints. In addition, the interposed device is advantageously secured to the piston by a ball joint.

Further, it is advantageously provided that that the interposed device is guided in the carrier, like the brake plate, in order to support braking torque and so that this torque is not applied to the piston in the thrust centre. Preferably it comprises two lugs mounted in grooves guiding the brake pad.

The interposed device comprises means for securing the piston in the axial direction. Very advantageously, in the case of a sliding caliper disc brake, the securing means are such that they are automatically activated when the caliper is closed onto the pads.

The disc brake advantageously comprises an electromechanical actuator of a single-piston brake, making it possible to make an electromechanically actuated dual-piston disc brake without having to redevelop an electromechanical actuator specific to the movement of two pistons. In addition, the weight and overall size are further reduced.

In one example, the interposed device is assembled between the piston and the internal brake pad.

In another example, the interposed device is attached to the internal brake pad, for example it is a single piece, the interposed device can then be replaced with the worn pad.

Thereby, one subject-matter of the present invention is a disc brake comprising a carrier, at least one first brake pad slidably mounted in the carrier, said first brake pad comprising a pad support and friction material, a caliper comprising at least one piston slidably mounted in the caliper so as to move the first brake pad relative to the carrier, at least one actuator configured to move the piston axially, and an interposed device interposed between the piston and the first brake pad forming a spreader so as to distribute the thrust force exerted by the piston over at least two zones of the first brake pad, at least partly distinct from the projection of the piston onto the first brake pad.

In an advantageous example, the interposed device comprises a first piece and at least two second pieces and a ball joint between the first piece and each second piece.

In the case where the carrier comprises at least two guide grooves for two lugs of said first brake pad, the second pieces of the interposed device advantageously each comprise a branch, a free end of which is mounted into one of said grooves.

The brake preferably comprises a ball joint between the first piece and the piston. For example, the ball joint between the first piece and the piston comprises a first element integral with the piston and a second element integral with the first piece, the first element or the second element penetrating into the second element or the first element respectively, so as to form a ball joint between the piston and the interposed device and to ensure axial securement between the piston and the interposed device at least when the piston enters the caliper.

The at least two zones are preferably offset from each other transversely.

For example, the at least two zones have a circular shape. For example, the ball joints are arranged in such a way that their projection on the first brake pad is in the centre of these zones.

The disc brake may comprise a second brake pad, a first guide pin and a second guide pin allowing sliding between the caliper and the carrier, at least the second guide pin allowing rotation of the caliper about the first guide pin. The caliper may also comprise an arch and nose for applying force to the second brake pad.

As an additional feature, one of the first and second elements comprises a case opening towards the arch of the caliper and a window opening towards the second or first element respectively, and the second or first element comprises a head and a rod, the head being dimensioned to penetrate the case, and to form an axial stop between the piston and the interposed device.

Advantageously, the interposed device is manufactured in the same material as the piston.

In one exemplary embodiment, the caliper comprises a piston and an actuator for said piston and the carrier and the first brake pad have dimensions of a brake pad of a dual-piston disc brake.

In one advantageous example, the actuator is an electromechanical actuator.

Another subject-matter of the present invention is an interposed device for being interposed between a piston of a disc brake and an internal brake pad support, comprising a first piece and at least two second pieces, with a ball joint between the first piece and each second piece. Said first piece is configured to be secured to the piston by a ball joint and said second pieces are to be pressed against a pad support of a brake pad.

Preferably, each second piece comprises a surface for transmitting a thrust force to the pad support and a portion for cooperating with the carrier to ensure its guidance in the carrier.

Another subject-matter of the present invention is a brake pad comprising a pad support and a friction material and an interposed device according to the invention, attached to a face of the pad support opposite that carrying the friction material.

Another subject-matter of the present invention is a method for manufacturing a sliding caliper disc brake according to the invention, comprising:
  manufacturing a caliper comprising a body comprising a housing for a piston and an electromechanical actuator and an arch of a dual-piston disc brake,
  manufacturing a piston with a connecting element,
  mounting said piston into the housing of the caliper body,
  manufacturing a carrier of a dual-piston brake,
  assembling the caliper and the carrier by mounting a guide pin between the carrier and the caliper,
  placing the caliper into a raised position,
  mounting the inner and outer brake pads of a dual-piston brake into the carrier,
  manufacturing an interposed device,
  mounting the interposed device against the internal brake pad support,
  pivoting the carrier towards the yoke, with the connecting element of the piston cooperating with the first piece of the interposed device,
  installing the second guide pin between the carrier and the caliper.

BRIEF DESCRIPTION OF THE DRAWINGS

The present invention will be better understood based on the following description and the appended drawings in which.

DETAILED DISCLOSURE OF PARTICULAR EMBODIMENTS

Figure 1:
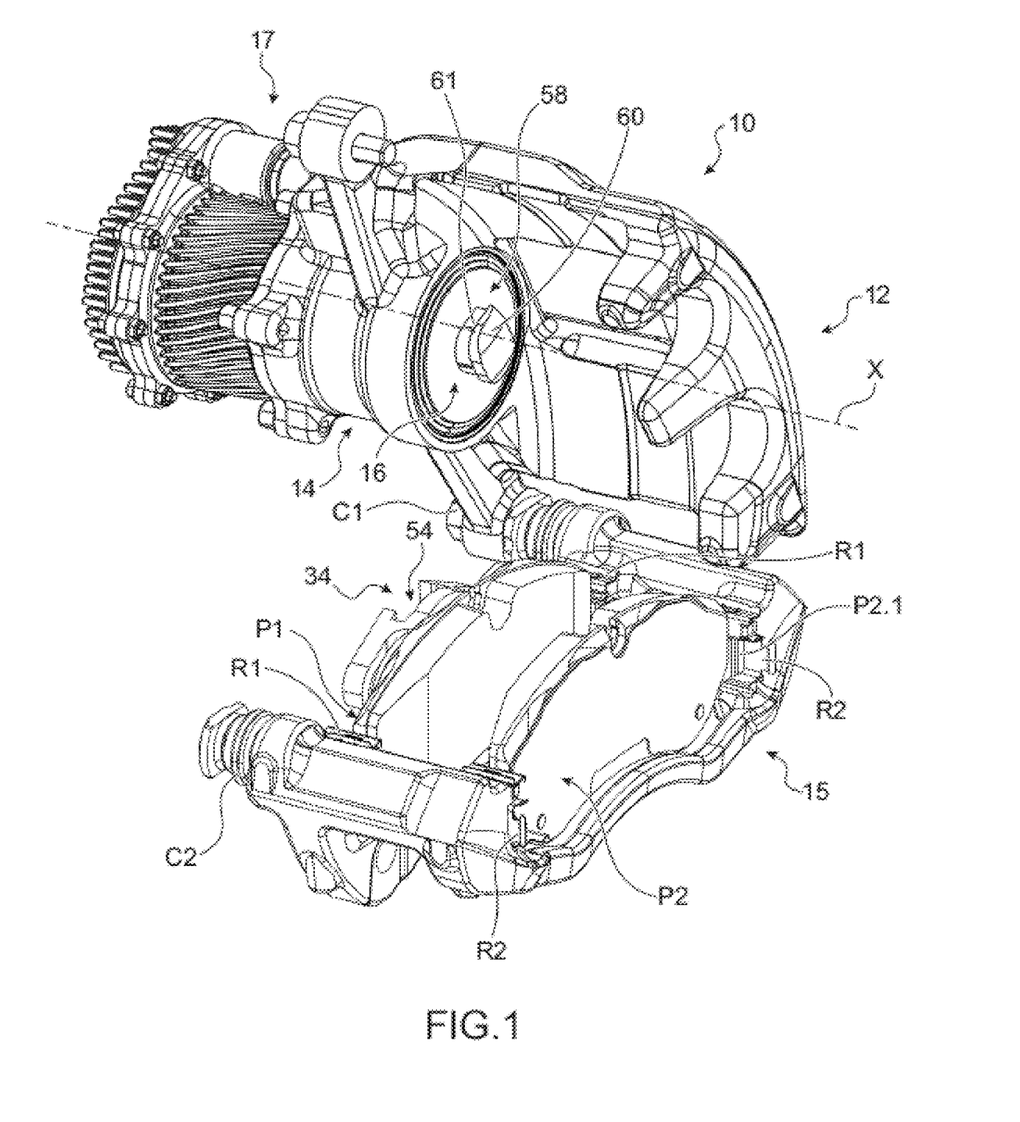
FIGS. 1 to 3 are perspective views of an example of a disc brake according to the invention in different positions of the caliper, between an open and a closed position.
Figure 2:
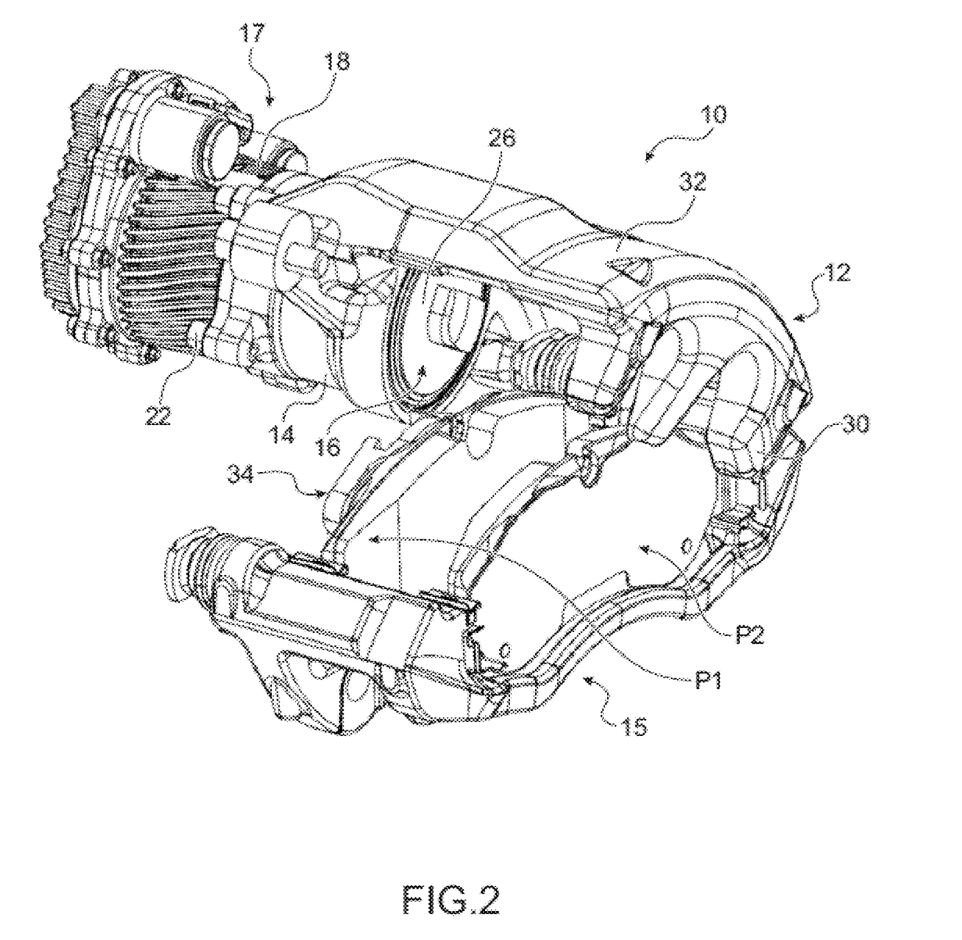
Figure 3:
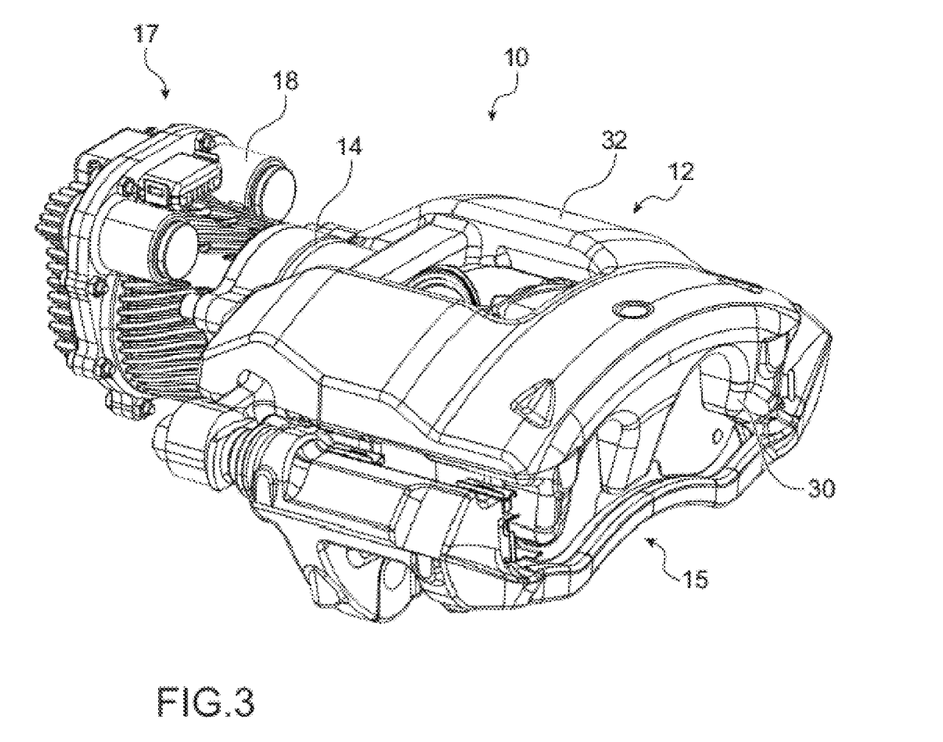

In FIGS. 1 to 3, an example of a disc brake according to the invention can be seen. In this example, the brake is fully electromechanically actuated, the electromechanical actuator actuated by an electric motor provides both braking during driving (service brake) and braking during parking (parking brake). As will be seen alternatively, the disc brake comprises a hydraulic actuator.

In the description that follows, identical, analogous or similar elements and components will be designated by the same references.

The axial direction is parallel to the disc axis and the transverse direction is orthogonal to the disc axis.

The upstream-downstream direction is considered to be the direction of axial movement of the piston in the braking phase.

The disc brake 10 comprises a caliper 12 with a rear case 14 in which a brake piston 16 is slidably mounted axially along the axis X. The disc brake also comprises a carrier 15 for being be attached to the stub axle of a wheel. The carrier 15 supports the brake shoes or brake pads P1 and P2.

The disc brake comprises two guide pins C1 and C2 allowing the caliper to slide in relation to the carrier. One C2 of the guide pins allows the brake to be opened by pivoting the caliper about the other C1 guide pin and to replace the brake pads.

The brake pads comprise lugs, only lugs P2.1, P2.1 of the external plate P2 are visible. The lugs extend laterally outwards and cooperate with grooves 19 or throats carried by the carrier to ensure that the pads are guided axially in relation to the disc. In the example represented, springs R1, R2 are advantageously mounted into the grooves and receive the lugs. The springs facilitate sliding of the pads and can provide function of axial guiding and return, and even wear compensation.

The disc brake 10 comprises rearwardly, a motor reduction unit or electromechanical actuator 17, of which a case 18, which houses an electric motor and a reduction gear mechanism, for example with planetary gears, has been represented. The case 18 is transferred and attached to a rear side of the caliper 12, against which the case 18 is attached, here by means of screws 22. The rear case 14 of the caliper 12 delimits a cavity in which the piston 16 is slidably sealingly mounted axially in both senses along the axis X. The brake piston 16 is a generally disc-shaped piece, one downstream face 26 of which is to cooperate with an associated disc brake pad P1, called an internal shoe or internal pad.

The motor reduction unit is, for example, close or similar to the motor reduction unit described in document FR3024516.

For example, the piston comprises, projecting from its upstream face 27 opposite to face 26, a screw 29 (FIGS. 6 and 7) for cooperating with a nut (not represented) for being rotatably driven by an electric motor.

Figure 4:
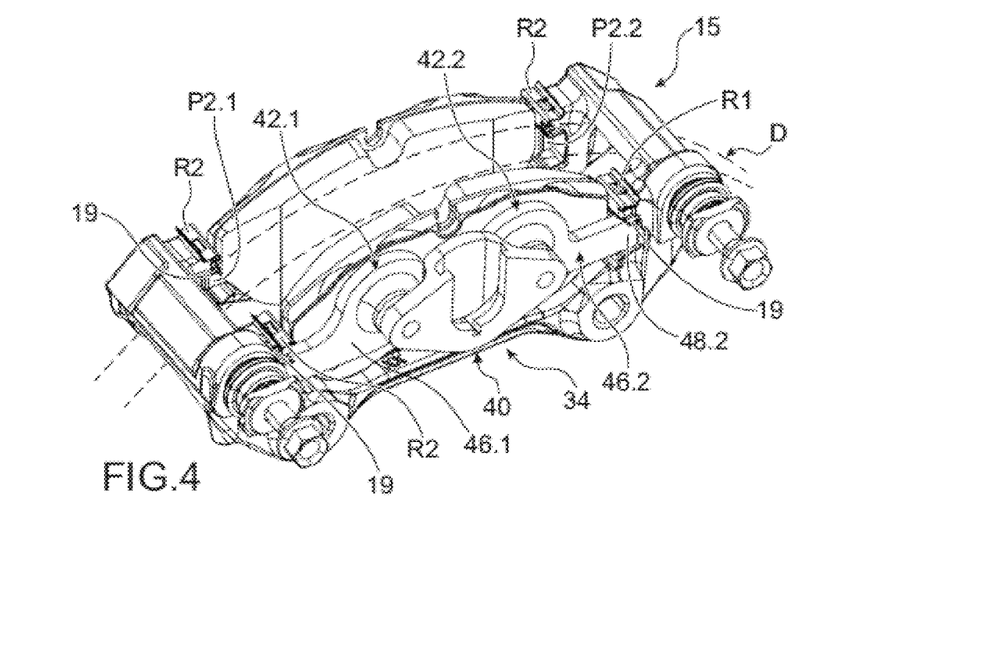
FIG. 4 is a perspective view of the carrier carrying the brake pads and the interposed device of the brake of FIGS. 1 to 3.
Figure 5:
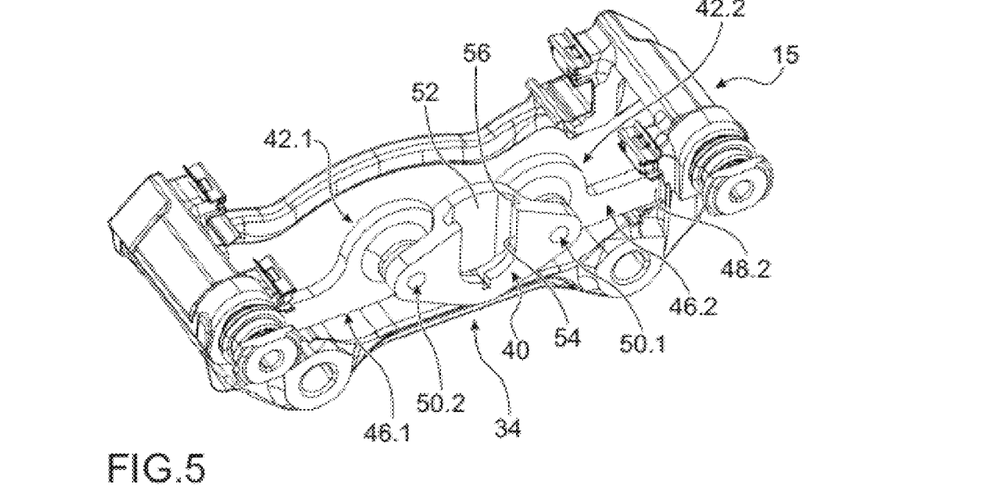
FIG. 5 is a perspective view of the carrier and interposed device without the brake pads.

In the example represented, the caliper 12 is of the sliding type. The caliper comprises a caliper nose 30 connected to the case 18 by an arch 32 and for overlapping the brake disc D (represented in dotted line in FIG. 4). The nose 30 is located axially downstream of the external pad when considering the direction of movement of the internal pad P1. The nose 30 is designed to exert a thrust force on the external pad P2 in the direction of the disc in the following way.

The internal pad P1 is moved by piston 16 to come into contact with one side of the disc and the external pad P2 is moved towards the other side of the disc by moving the caliper by reaction, due to the contact between the internal pad and the brake disc.

In this example, the dimensions of the disc D for being braked by the disc brake, the brake pads P1, P2, the carrier 15 supporting the pads and at least the arch 32 and the caliper nose 30 are those of a dual-piston disc brake, i.e. a disc brake comprising a case in which two pistons for pressing against the internal pad are usually mounted.

However, as described above, disc brake 10 comprises only one piston. In order to ensure application of thrust forces distributed in a balanced manner to the internal pad P1 with only one piston, and consequently the stability of the pad when it is driven by friction through the rotation of the disc, the disc brake comprises an interposed device 34 which ensures a distribution of forces on the internal pad which would be that obtained by means of two pistons.

The interposed device 34 is visible in more detail in FIGS. 4 to 7.

In the example represented, the interposed device 34 comprises an upstream side 36 cooperating with the piston and a downstream side 38 cooperating with the rear axial face of the internal brake pad P1.

The upstream side 36 receives the thrust exerted by the piston and the downstream side ensures a balanced distribution of thrust on the brake pad. The interposed device comprises a first piece 40 on the upstream side 36 in contact with the piston nose and two second pieces 42.1, 42.2 on the downstream side cooperating with the brake pad.

In the example represented, each second piece 42.1, 42.2 comprises a first, substantially disc-shaped part 44.1, 44.2 and a second, branch-forming part 46.1, 46.2 extending substantially tangentially. Both branches 46.1, 46.1 are oriented so as to extend in a plane orthogonal to the axis X laterally outwardly from part 44.1, 44.2 respectively.

The free lateral ends 48.1, 48.2 of both branches 46.1, 46.2 are to be housed in the grooves of the carrier and to provide radial force transfer.

Each piece 44.1, 44.2 presses against the rear face of the pad in a zone corresponding to that against which one of the pistons of a dual-piston disc brake would press. The shape and dimensions of the discs of the parts 44.1, 44.2 correspond to the external contour of the contact surface between each piston and the pad in a dual-piston brake.

The first piece 40 is mechanically connected with the second pieces 42.1, 42.2 by two ball joints 50.1, 50.2 substantially located in the centre of each of parts 44.1, 44.2. The first piece receives a thrust force from the piston along the sliding axis X of the piston, which is distributed over both parts 44.1, 44.2 of the second piece 42 in a balanced manner. Indeed, the first piece, the second piece 42 and both ball joints form a spreader. The force received by the first piece 42 is thus distributed in a balanced manner over both pieces 44.1, 44.2, i.e. over the contact zones of both pistons. The internal brake pad P1 receives balanced thrust forces at both piston contact zones. The internal pad therefore undergoes the thrust forces applied by two pistons.

Axial securing means are provided between the piston and the interposed device so that the internal pad P1 moves away from the disc when the piston is retracted. The axial securing means are such that they form a joint between the piston and the interposed device, which joint is advantageously a ball joint between the piston and the interposed device. In addition, they can have radial clearance so as to support the movement of the brake pad P1 undergoing torque during a conventional braking phase.

Figure 6:
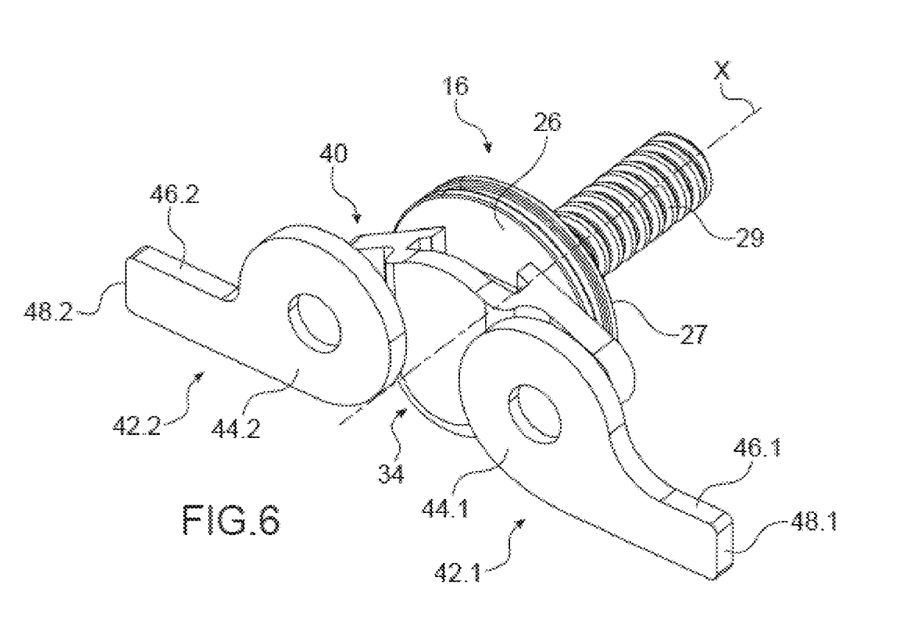
FIGS. 6 and 7 are perspective views of the interposed device with the piston of FIGS. 1 to 3.
Figure 7:
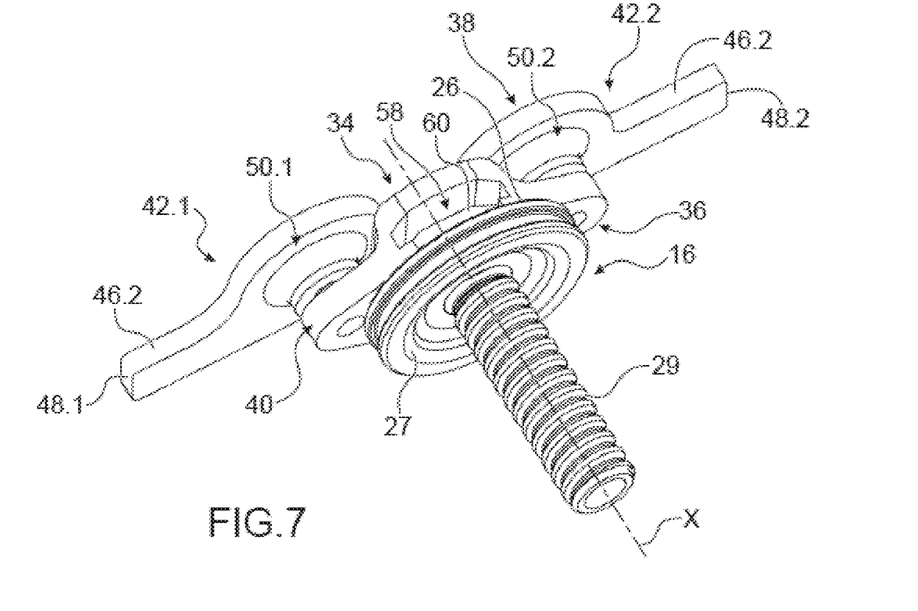

In the example represented and very advantageously, the axial securing means comprise a case 52 formed in the first piece 40 and provided with a window 54 opening into the upstream face, the case also opens towards the caliper arch. The dimensions of window 54 in a plane orthogonal to the axis X are smaller than that of housing 52 so that, when seen from inside the case 52, window 54 is bordered by an edge 56.

The piston comprises a connecting element 58 axially projecting from face 26. The connecting element 58 comprises a head 60 connected to the nose by a rod 61 with a smaller cross-sectional dimension than those of the head 60 and window 54. The transverse dimensions of the head 60 are in turn larger than those of the window 54 and smaller than those of the housing 52.

When the head 60 is slidingly inserted into the housing 52 through its upper opening, the rod 61 slides into the window 54. The head 60 cooperates with the flange 56 and axially secures the piston and the interposed device at least in a downstream to upstream movement, while providing a swivel capability between the piston and the first piece. Furthermore, a clearance is provided between the connecting element 58 and the housing and window of the first piece 40.

These axial securing means are particularly advantageous as they ensure that the piston and the interposed device are automatically secured when the brake caliper is pivoted about one of its guide pins C1 to close the brake, as is illustrated in FIGS. 1, 2, 3. When the caliper is pivoted, the connecting element 58 moves closer to housing 52 (FIG. 2) until it penetrates it. Through these means, the piston and interposed device do not need to be secured subsequently.

Alternatively, the connecting element 58 is carried by the first piece and the housing is formed in the piston.

Any other means of securing the first part to the piston which is capable of swivelling and which can provide radial clearance is contemplatable.

In the example represented, the balls of the ball joints are mounted into the second piece. Alternatively, the balls of the ball joints are mounted into the first piece.

Alternatively, the transfer device is integral with the piston and cannot be lost when the piston is mounted into the caliper body.

The interposed device is advantageously made of treated steel, preferably the same steel as the piston.

The operation of the disc brake according to the invention will now be described.

During a braking action while driving, the brake disc is thereby rotated, the piston is axially moved towards the disc. The piston applies a thrust force to the first piece 40 which transmits it to both second pieces 42 and distributes it in a balanced manner between both pieces 44.1, 44.2 due to the spreader-type mounting. The thrust force is thus distributed over the brake pad. Advantageously, the brake pad moves axially, with a plane of the front face remaining parallel to the plane of the disc. Both second pieces slide in relation to the carrier with the internal brake pad, with the branches sliding in the grooves. By reaction, the caliper slides and the caliper nose pushes the external plate towards the brake disc.

At the end of the braking phase, the piston moves back, taking the interposed device with it via the cooperation of connecting element 58 and housing 52, and the brake pads are translationally guided by springs R1, R2.

When the parking brake is applied, the brake disc is generally stationary, the electromechanical actuator is activated to slide the piston towards the disc. The piston applies a thrust force to the first piece 40 which transmits it to both second pieces 42, distributing it in a balanced manner between both pieces 44.1, 44.2 due to the spreader-type mounting. The thrust force is thus distributed to the brake pad. Both second pieces 42.1, 42.2 slide relative to the carrier 15 with the internal brake pad P1, with the branches sliding in the grooves. By reaction, the caliper 12 slides and the caliper nose pushes the outer brake pad P2 towards the brake disc.

At the end of the parking braking phase, the electromechanical actuator 17 is actuated to return the piston into the caliper, the piston slides axially away from the disc taking the interposed device with it via the cooperation of connecting element 58 and housing 52, and the brake pads are guided axially by springs R1, R2.

An example of a method for manufacturing the brake of FIGS. 1 to 3 will now be described.

In a first step, a caliper is manufactured which comprises a body with a case for a piston and an electromechanical actuator and the arch of a dual-piston disc brake. A piston with a connecting element 58 is mounted into the housing. A carrier of a dual-piston brake is also manufactured.

The caliper and carrier are assembled by mounting a guide pin C1. The caliper is disposed in a raised position as shown in FIG. 1.

Internal P1 and external P2 brake pads of a dual-piston brake are mounted in the carrier.

The interposed device is mounted against the pad support of the internal brake pad, and the free ends of the branches of the second pieces are slid into the springs mounted in the grooves.

The caliper is pivoted downwards, the head 60 of the connecting element 58 penetrates the housing 52 and the rod 61 slides into the window 54. Piston and interposed device are assembled.

The second guide pin C2 is placed.

The disc brake is ready to be mounted on a stub axle of an automotive vehicle.

The addition of the interposed device adds little complexity to the brake manufacturing method and the brake pad replacement method.

In the example represented, the second pieces transferring pressure of the pistons onto the brake pads are circular in shape, which is the conventional shape of a disc brake piston.

The addition of the interposed device provides an additional degree of freedom in the choice of shape and dimensions of the thrust load application zones. The second pieces can have any shape or cross-section adapted to best distribute braking forces on the brake pad, for example both pieces have different surface areas and/or different shapes depending on the stresses on the different zones of the brake pad.

Alternatively, the second pieces are removably attached to the internal brake pad P1 so that they are axially integral with it. The interposed device is then either replaced at each pad change or not.

Further alternatively, the second pieces are permanently attached to the pad support. Thus the invention also relates to a brake pad comprising an interposed device ensuring distribution of the thrust force in at least two zones transversely offset from the upstream face of the internal brake pad. The interposed device is then replaced each time the pad is changed.

In another exemplary embodiment, the interposed device allows the thrust force exerted by the piston to be distributed into more than two zones, for example into four zones, with the centres of the four zones being, for example, the vertices of a rectangle.

The interposed device according to the invention offers the advantage of allowing the use of the single-piston electromechanical actuator of disc brakes, thus making the construction of disc brakes with a pressing cross-section area identical to a dual-piston brake or even more than two pistons is simplified and does not require the redevelopment of an electromechanical actuator allowing the movement of two or more pistons. In addition, the mass and overall size are significantly reduced as compared to an electromechanical actuator that allows the movement of two or more pistons. In addition, the present invention makes it possible to achieve variable support cross-section areas as a pressing part for a pad, for example to compensate for differential wear.

Further, the invention also applies to a disc brake whose actuator comprises several pistons, for example two, making it possible to distribute the thrust forces of both pistons over a brake pad of large dimensions, especially for a pad of a great length.

The interposed device is particularly advantageous in the case of an electromechanically actuated disc brake with or without a parking brake. However, it will be understood that the interposed device can be applied to a disc brake with a mechanically actuated parking brake, for example through a cable, and also to a hydraulic disc brake with or without a parking brake function.

Further, the invention has been described within the scope of a sliding disc brake, called a floating caliper brake, but the application to a fixed disc brake, i.e. comprising at least one piston per brake pad, does not depart from the scope of the present invention.

REFERENCES 10 disc brake
12 caliper
14 back case
15 carrier
16 piston
17 electromechanical actuator
18 actuator case
19 grooves
22 screw
26 downstream face of the piston
27 upstream face of the piston
29 screw
30 caliper nose
32 arch
34 interposed device
36 upstream side of the interposed device
38 downstream side of the interposed device
40 first piece
42.1, 42.2 second pieces
44.1, 44.2 first part
46.1, 46.2 branches
48.1, 48.2 free lateral ends
50.1, 50.2 ball joints
52 housing
54 window
56 flange
58 connecting element
60 head
61 rod
C1 first guide pin
C2 second guide pin
P1 first brake pad
P2 second brake pad
P2.1, P2.2 lugs
R1, R2 springs
X sliding axis of piston 16

What is claimed is:

1. A disc brake comprising at least one first brake pad slidably mounted said first brake pad comprising a pad support and a friction material, a caliper comprising at least one piston slidably mounted in the caliper so as to move the first brake pad at least one actuator configured to move the piston axially, and an interposed device interposed between the piston and the first brake pad forming a spreader so as to distribute the thrust force exerted by the piston over at least two zones of the first brake pad, at least partly distinct from the projection of the piston onto the first brake pad, wherein the interposed device comprises a first piece and at least two second pieces and a first ball joint between the first piece and each second piece.

2. The disc brake according to claim 1, further comprising a carrier, wherein the brake pad is slidably mounted in the carrier, wherein the piston is slidably mounted in the caliper so as to move the first brake pad relative to the carrier, wherein the carrier comprises at least two guide grooves for guiding two lugs of said first brake pad and wherein the second pieces each comprise a branch, a free end of which is mounted into one of said grooves.

3. The disc brake according to claim 2, further comprising a second brake pad, a first guide pin and a second guide pin allowing sliding between the caliper and the carrier, at least the second guide pin allowing rotation of the caliper about the first guide pin, and wherein the caliper comprises an arch and a nose configured for applying a force to the second brake pad.

4. The disc brake according to the claim 2, comprising a second brake pad, a first guide pin and a second guide pin allowing sliding between the caliper and the carrier, at least the second guide pin allowing rotation of the caliper about the first guide pin, and wherein the caliper comprises an arch and a nose configured for applying a force to the second brake pad, and wherein one of the first and second elements comprises a housing opening towards the arch of the caliper and a window opening towards the second element or the first element respectively, and the second or first element comprises a head and a rod, the head being dimensioned to penetrate the housing, and to form an axial stop between the piston and the interposed device.

5. The disc brake according to claim 2, wherein the carrier is configured to accommodate a brake pad of a dual-piston disc brake.

6. The interposed device according to claim 2, wherein each second piece comprises a surface for transmitting a thrust force to the pad support and a portion for cooperating with the carrier to ensure its guidance in the carrier.

7. The disc brake according to claim 1, comprising a second ball joint between the first piece and the piston.

8. The disc brake according to claim 7, in which the second ball joint between the first piece and the piston comprises a first element integral with the piston and a second element integral with the first piece, the first element or the second element penetrating into the second element or the first element respectively, so as to form a ball joint between the piston and the interposed device and to ensure axial securement between the piston and the interposed device at least when the piston enters the caliper.

9. The disc brake according to the claim 8, comprising a second brake pad, a first guide pin and a second guide pin allowing sliding between the caliper and a carrier, at least the second guide pin allowing rotation of the caliper about the first guide pin, and wherein the caliper comprises an arch and a nose configured for applying a force to the second brake pad, and wherein one of the first and second elements comprises a housing opening towards the arch of the caliper and a window opening towards the second element or the first element respectively, and the second or first element comprises a head and a rod, the head being dimensioned to penetrate the housing, and to form an axial stop between the piston and the interposed device.

10. The disc brake according to claim 1, in which the at least two zones have a circular shape.

11. The disc brake according to claim 10, in which the first ball joints are arranged so that their projection on the first brake pad is in the centre of said zones.

12. The disc brake according to claim 1, in which the at least two zones are transversely offset in relation to each other.

13. The disc brake according to claim 1, wherein the interposed device is manufactured in the same material as the piston.

14. The disc brake according to claim 1, wherein the actuator is an electromechanical actuator.

15. The disc brake according to claim 1, wherein said first brake pad is a brake pad for a dual-piston disc brake.

16. An interposed device for being interposed between a piston of a disc brake and an internal brake pad support, comprising a first piece and at least two second pieces, a first ball joint between the first piece and each second piece, wherein said first piece is configured to be secured to the piston by a second ball joint and wherein said second pieces are intended to be pressed against a pad support of a brake pad.

17. The interposed device according to claim 16, wherein each second piece comprises a surface for transmitting a thrust force to the pad support and a portion for cooperating with a carrier to ensure its guidance in the carrier.

18. A brake pad comprising a pad support and friction material and an interposed device according to claim 16, attached to a face of the brake pad support opposite to that carrying the friction material.

19. A method for manufacturing a sliding caliper disc brake, wherein the disc brake comprises at least one first brake pad slidably mounted, said first brake pad comprising a pad support and a friction material, a caliper comprising at least one piston slidably mounted in the caliper so as to move the first brake pad, at least one actuator configured to move the piston axially, and an interposed device interposed between the piston and the first brake pad forming a spreader so as to distribute the thrust force exerted by the piston over at least two zones of the first brake pad, at least partly distinct from the projection of the piston onto the first brake pad, wherein the interposed device comprises a first piece and at least two second pieces and a first ball joint between the first piece and each second piece, wherein the disc brake comprises a second brake pad, a first guide pin and a second guide pin allowing sliding between the caliper and a carrier, at least the second guide pin allowing rotation of the caliper about the first guide pin, and wherein the caliper comprises an arch and a nose configured for applying a force to the second brake pad, the method comprising:
manufacturing a caliper comprising a body comprising a housing for a piston and an electromechanical actuator and an arch of a dual-piston disc brake,
manufacturing a piston with a connecting element,
mounting said piston in the housing of the caliper body,
manufacturing a carrier of a dual-piston brake,
assembling the caliper and the carrier by mounting a guide pin between the carrier and the caliper,
placing the caliper into a raised position,
mounting the first and second brake pads of a dual-piston brake into the carrier,
manufacturing an interposed device,
mounting the interposed device against the first brake pad support,
pivoting the caliper towards the carrier, with the connecting element of the piston cooperating with the first part of the interposed device,
installing the second guide pin between the carrier and the caliper.

20. A method for manufacturing a sliding caliper disc brake wherein the disc brake comprises at least one first brake pad slidably mounted, said first brake pad comprising a pad support and a friction material, a caliper comprising at least one piston slidably mounted in the caliper so as to move the first brake pad, at least one actuator configured to move the piston axially, and an interposed device interposed between the piston and the first brake pad forming a spreader so as to distribute the thrust force exerted by the piston over at least two zones of the first brake pad, at least partly distinct from the projection of the piston onto the first brake pad, wherein the interposed device comprises a first piece and at least two second pieces and a first ball joint between the first piece and each second piece, wherein the disc brake comprises a second ball joint between the first piece and the piston,
wherein the second ball joint between the first piece and the piston comprises a first element integral with the piston and a second element integral with the first piece, the first element or the second element penetrating into the second element or the first element respectively, so as to form a ball joint between the piston and the interposed device and to ensure axial securement between the piston and the interposed device at least when the piston enters the caliper,
wherein the disc brake comprises a second brake pad, a first guide pin and a second guide pin allowing sliding between the caliper and a carrier, at least the second guide pin allowing rotation of the caliper about the first guide pin, and wherein the caliper comprises an arch and a nose configured for applying a force to the second brake pad, and wherein one of the first and second elements comprises a housing opening towards the arch of the caliper and a window opening towards the second element or the first element respectively, and the second or first element comprises a head and a rod, the head being dimensioned to penetrate the housing, and to form an axial stop between the piston and the interposed device, the method comprising:
manufacturing a caliper comprising a body comprising a housing for a piston and an electromechanical actuator and an arch of a dual-piston disc brake,
manufacturing a piston with a connecting element,
mounting said piston in the housing of the caliper body,
manufacturing a carrier of a dual-piston brake,
assembling the caliper and the carrier by mounting a guide pin between the carrier and the caliper,
placing the caliper into a raised position,
mounting the first and second brake pads of a dual-piston brake into the carrier,
manufacturing an interposed device,
mounting the interposed device against the first brake pad support,
pivoting the caliper towards the carrier, with the connecting element of the piston cooperating with the first part of the interposed device,
installing the second guide pin between the carrier and the caliper.

* * * * *